United States Patent
Mahajan et al.

(10) Patent No.: US 12,524,942 B2
(45) Date of Patent: Jan. 13, 2026

(54) SYSTEM AND METHOD TO DISPLAY PROFILE INFORMATION IN A VIRTUAL ENVIRONMENT

(71) Applicant: Bank of America Corporation, Charlotte, NC (US)

(72) Inventors: Navdeep Mahajan, Charlotte, NC (US); Darshan K. Nanjegowda, Charlotte, NC (US); Pavan Chayanam, Alamo, CA (US); Prashanth Kolar, Dublin, CA (US); Srinivas Dundigalla, Waxhaw, NC (US); Arunachalam Packirisamy, Pleasant Hill, CA (US); Indradeep Dantuluri, Harrisburg, NC (US)

(73) Assignee: Bank of America Corporation, Charlotte, NC (US)

(*) Notice: Subject to any disclaimer, the term of this patent is extended or adjusted under 35 U.S.C. 154(b) by 262 days.

(21) Appl. No.: 18/055,112

(22) Filed: Nov. 14, 2022

(65) Prior Publication Data

US 2024/0161375 A1    May 16, 2024

(51) Int. Cl.
| | |
|---|---|
| *H04L 9/32* | (2006.01) |
| *G06F 3/01* | (2006.01) |
| *G06T 13/40* | (2011.01) |
| *H04L 67/306* | (2022.01) |

(52) U.S. Cl.
CPC ............ *G06T 13/40* (2013.01); *G06F 3/017* (2013.01); *H04L 9/3213* (2013.01); *H04L 67/306* (2013.01)

(58) Field of Classification Search
CPC ....... H04L 9/32; H04L 9/3213; H04L 67/306; G06T 13/40; G06F 3/017
See application file for complete search history.

(56) References Cited

U.S. PATENT DOCUMENTS

| | | |
|---|---|---|
| 9,787,936 B2 | 10/2017 | Trachtenberg et al. |
| 9,865,222 B2 | 1/2018 | Trachtenberg et al. |
| 9,972,239 B2 | 5/2018 | Trachtenberg et al. |
| 10,373,129 B1 | 8/2019 | James et al. |
| 10,504,193 B2 | 12/2019 | Isaacson et al. |
| 10,511,580 B2 | 12/2019 | Isaacson et al. |
| 10,540,653 B1 | 1/2020 | James et al. |

(Continued)

FOREIGN PATENT DOCUMENTS

KR    102423989 B1 *  7/2022

*Primary Examiner* — Daniel B Potratz

(57) ABSTRACT

An apparatus for displaying profile information in a virtual environment comprises a processor associated with a server. The processor is configured to generate an authorization token configured to assign a first avatar to a first user, wherein the authorization token is stored within the plurality of transfers of the blockchain record. The processor is further configured to receive session data associated with the first avatar, wherein the session data comprises at least one gesture for a session in a virtual environment and to compare the at least one gesture of the session data to one or more authorized gestures to identify a first authorized gesture. The processor is further configured to display profile information in the virtual environment that is stored in a first user profile associated with the first user in response to identifying the first authorized gesture.

20 Claims, 4 Drawing Sheets

(56) References Cited

U.S. PATENT DOCUMENTS

| | | | |
|---|---|---|---|
| 10,540,654 B1 | 1/2020 | James et al. | |
| 10,855,760 B2 | 12/2020 | Ratias | |
| 10,908,771 B2 | 2/2021 | Berquam et al. | |
| 10,929,842 B1 | 2/2021 | Arvanaghi et al. | |
| 11,017,391 B1 | 5/2021 | Winklevoss et al. | |
| 11,139,955 B1 | 10/2021 | So et al. | |
| 11,200,569 B1 | 12/2021 | James et al. | |
| 11,307,614 B2 | 4/2022 | Trachtenberg et al. | |
| 2012/0204117 A1* | 8/2012 | Patil | G06F 9/451 |
| | | | 715/753 |
| 2017/0052676 A1 | 2/2017 | Pulier et al. | |
| 2017/0236196 A1 | 8/2017 | Isaacson et al. | |
| 2017/0249611 A1 | 8/2017 | Trachtenberg et al. | |
| 2018/0019984 A1 | 1/2018 | Isaacson et al. | |
| 2018/0198617 A1 | 7/2018 | Drouin et al. | |
| 2019/0107935 A1 | 4/2019 | Spivack et al. | |
| 2019/0230070 A1 | 7/2019 | Isaacson et al. | |
| 2020/0139631 A1 | 5/2020 | Buller et al. | |
| 2020/0297262 A1 | 9/2020 | Chappell, III et al. | |
| 2020/0394409 A1 | 12/2020 | Cristache | |
| 2021/0034679 A1 | 2/2021 | Cristache | |
| 2021/0094173 A1 | 4/2021 | Cristache | |
| 2022/0384027 A1* | 12/2022 | Kaleal, III | A61B 5/11 |
| 2023/0254300 A1* | 8/2023 | Silverstein | G06F 21/30 |
| | | | 726/10 |
| 2023/0289817 A1* | 9/2023 | Ashby | H04L 9/3226 |

\* cited by examiner

SYSTEM AND METHOD TO DISPLAY PROFILE INFORMATION IN A VIRTUAL ENVIRONMENT

TECHNICAL FIELD

The present disclosure relates generally to network communications and information security. More particularly, in certain embodiments, the present disclosure is related to a system and method to display profile information in a virtual environment.

BACKGROUND

In a network environment, user devices are in data communication with other user devices that may be distributed anywhere in the world. These network environments allow data and information to be shared among these devices. An organization entity may interact with user devices to provide services through different systems in a real-world environment and a virtual environment in a network. It is challenging to integrate the services involving communications in the real-world environment and the virtual environment. Some of the technical challenges that occur when data is exchanged between devices are controlling data leakage, unauthorized access to data, and preventing malicious activities.

SUMMARY

The disclosed system provides several practical applications and technical advantages that overcome the previously discussed technical problems. The following disclosure provides a practical application of a server that is configured as an information security device for a virtual environment. The disclosed information security device provides practical applications that improve the information security of a user in the virtual environment by determining pre-approved authorized operations through a blockchain record. Authentication of an identity of the user occurs by analyzing the blockchain record. This process provides a technical advantage that increases information security because it searches the blockchain record for an authorization token generated after a registration procedure performed by the user, thereby improving authenticity.

The disclosed system may further be integrated into an additional practical application of improving underlying operations of computing systems tasked to perform an operation for one or more users. For example, the disclosed system may reduce processing, memory, and time resources of a server for identifying and validating a gesture authorizing an operation. In this example, the disclosed system may store a listing of authorized gestures for a user in a database based on a registration procedure. The database may be accessed to determine if received data corresponding to a gesture performed by a user is associated with any one of the authorized gestures for a given user. In these examples, the disclosed system may not know the identity of the user based on the received data. The disclosed system may search a publicly-available blockchain record storing information related to each user and a corresponding avatar. The blockchain record may be searched to determine an identity of a user, wherein the server may then perform an operation based on the identification of that user. Once the user is identified, the server may perform an operation based on identifying a matching gesture in the gesture database. The disclosed system may improve the underlying operations of the server by utilizing the blockchain record to increase available storage space. The system may further improve operations of the server by reducing internal processing done by the server to identify the user, wherein the server may perform a search query on the blockchain record using stored data values for identification.

In an embodiment, an apparatus for displaying profile information in a virtual environment comprises a memory and a processor. The memory is operable to store a blockchain record comprising a plurality of transfers for a blockchain store a plurality of user profiles, wherein each one of the plurality of user profiles is associated with a user. The processor is operably coupled to the memory and configured to generate an authorization token configured to assign a first avatar to a first user, wherein the authorization token is stored within the plurality of transfers of the blockchain record. The processor is further configured to receive session data associated with the first avatar, wherein the session data comprises at least one gesture for a session in a virtual environment, wherein the at least one gesture is an action performed by the user that prompts the processor to perform an authorized operation, and to compare the at least one gesture of the session data to one or more authorized gestures to identify a first authorized gesture, wherein the first authorized gesture is configured to prompt the processor to display profile information for the user. In response to identifying the first authorized gesture, the processor is further configured to display profile information in the virtual environment that is associated with the first authorized gesture and stored in a first user profile associated with the first user.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

This disclosure provides solutions to the aforementioned and other problems of previous technology by verifying an instance of an authorized gesture to prompt display of profile information in a virtual environment.

Example System for Displaying Profile Information in a Virtual Environment

Figure 1:
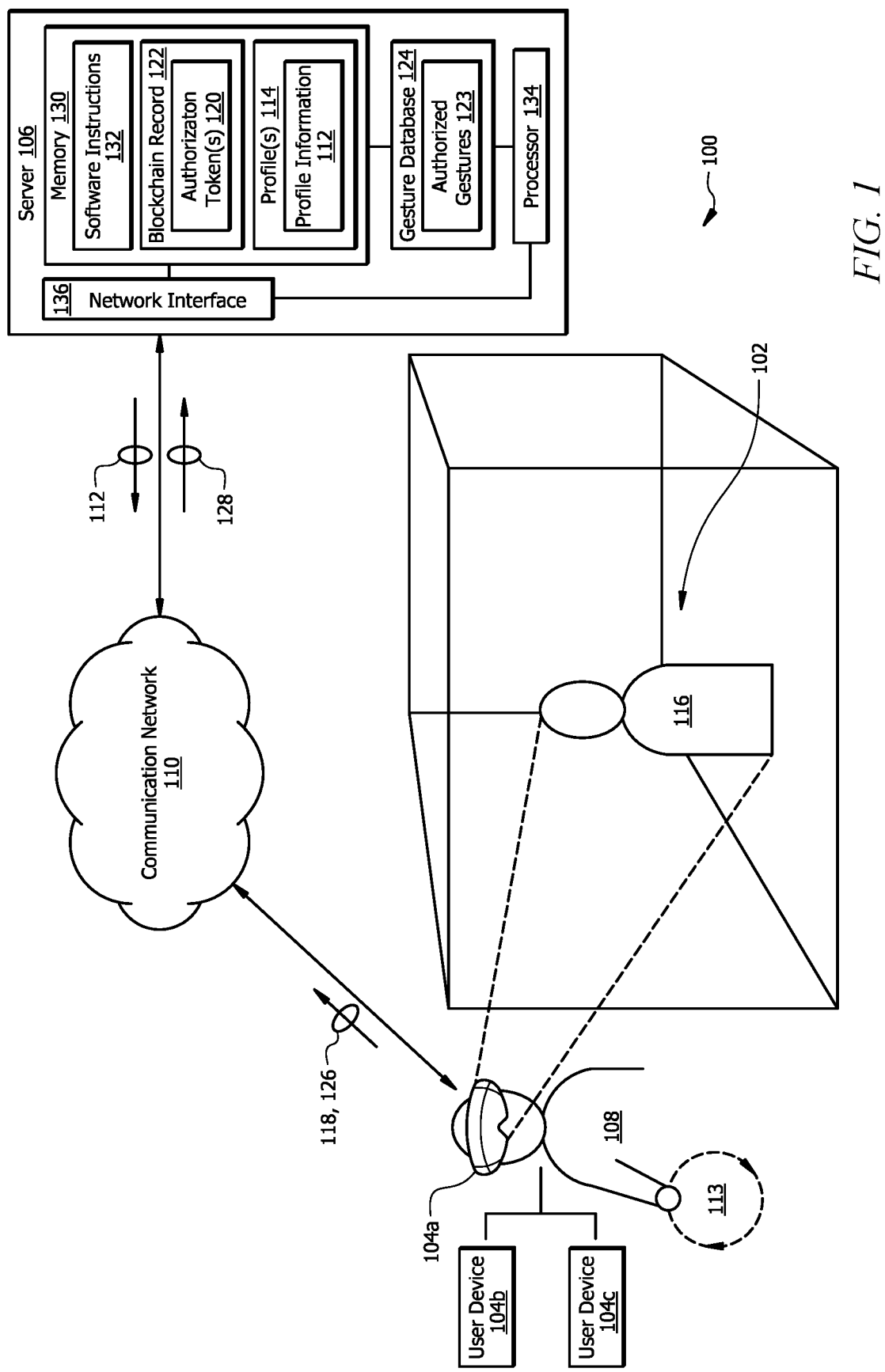
FIG. 1 is a schematic diagram of an example system for displaying profile information in a virtual environment.

FIG. 1 illustrates a schematic diagram of an example system 100 that is generally configured to display profile information in a virtual environment 102. The system 100 may include a first user device 104a, a second user device 104b, a third user device 104c, and a server 106. A first user 108 is associated with the first, second, and third user devices 104a, 104b, and 104c (collectively referred to herein as "the user devices 104"). The system 100 may be communicatively coupled to a communication network 110 and may be operable to transmit data between the user devices 104 and the server 106 through the communication network 110. In general, the system 100 may improve electronic interaction technologies by displaying profile information 112 associated with the first user 108 in the virtual environment 102 in response to a gesture 113 performed by the first user 108.

For example, in a particular embodiment, a user (for example, the first user 108) may attempt to interact with an entity and/or a rendered object in the virtual environment 102. In this example, the first user 108 may not know a real-time status of the profile information 112 corresponding to the first user 108, where the first user 108 may decide whether or not to initiate or proceed with an interaction. For example, the profile information 112 may include virtual resources and/or real-world resources for use in a suitable interaction where the first user 108 may transfer virtual resources and/or real-world resources in exchange for goods and/or services. The first user 108 may perform the gesture 113 detectable by the user devices 104 that may initiate operation of the server 106 to provide the profile information 112 to the first user 108. In this example, the gesture 113 may comprise of the first user 108 rotating a hand in a clockwise, circular motion. In these examples, a profile 114 associated with the first user 108 may be established with the server 106 for storing the profile information 112, wherein the performed gesture 113 may be verified with reference to the profile 114. Upon verification, the server 106 may display the profile information 112 in the virtual environment 102 for communication to the first user 108, wherein the first user 108 may view the displayed profile information 112 via the user devices 104.

The first user 108 may access the virtual environment 102 through the user devices 104. For example, the first user device 104a may be a wearable device (e.g., glasses or a headset), and the second and third user devices 104b, 104c may be hand-held controllers. The first user device 104a may be configured to display the virtual environment 102, and the second and third user devices 104b, 104c may be configured to control movement of a first avatar 116 associated with the first user 108 in the virtual environment 102. In embodiments, the first user device 104a is configured to display a two-dimensional (2D) or three-dimensional (3D) representation of the virtual environment 102 to the first user 108. Examples of a virtual environment 102 may include, but are not limited to, a graphical or virtual representation of a metaverse, a map, a building interior, a landscape, a fictional location, an alternate reality, or any other suitable type of location or environment. The virtual environment 102 may be configured to use realistic or non-realistic physics for the motion of objects within the virtual environment 102. For example, some virtual environments 102 may be configured to use gravity whereas other virtual environments 102 may not be configured to use gravity.

Within the virtual environment 102, each user may be associated with an avatar (such as the first avatar 116 for the first user 108). An avatar is a graphical representation of the user at a virtual location within the virtual environment 102. Examples of an avatar may include, but are not limited to, a person, an animal, or an object. In some embodiments, the features and characteristics of the avatar may be customizable and user-defined. For example, the size, shape, color, attire, accessories, or any other suitable type of appearance features may be specified by a user. In embodiments, the virtual location of the avatar may be correlated to a physical location of a user in the real-world environment. By using an avatar, a user is able to move within the virtual environment 102 to interact with another avatar and objects (such as an entity or a rendered object) within the virtual environment 102 while independently remaining at the physical location or being in transit in the real-world environment.

While engaging in the virtual environment 102 via the first avatar 116, the first user 108 may attempt to interact with an entity and/or rendered object. For example, the first user 108 may attempt to engage in an interaction session through the first avatar 116 to exchange virtual resources and/or real-world resources. Before the interaction occurs, the first user 108 may act to prompt the server 106 to display the profile information 112 associated with the first user 108 in the virtual environment 102. In alternate embodiments, the first user 108 may prompt display of the profile information 112 at any suitable time, including when the first avatar 116 is not interacting with an entity or rendered object. For example, the first user 108 may perform the gesture 113 triggering action by the server 106. The gesture 113 may be detected by at least one of the user devices 104, and a signal indicating the gesture 113 may be sent to the server 106 for processing. Without limitations, the gesture 113 may be any suitable physical movement, any suitable audio signal generated by the first user 108, or a combination thereof. Example gestures 113 as physical movements may include a hand motion, an arm motion, a head motion, or any combinations thereof. Example gestures 113 as audio signals may include a sound, a word, a phrase comprising more than one word, or any combination thereof. The server 106 may verify the gesture 113 performed by the first user 108 and may perform an operation based on the received gesture 113 (i.e., displaying profile information 112).

In embodiments, the first user 108 may be required to sign into a secure portal to perform a registration procedure prior to engaging in a virtual environment session. After the registration procedure, the first user 108 may continue to sign into the secure portal to engage in the virtual environment 102 in any subsequent virtual environment session. In embodiments, a virtual environment session may be referred to as a period of activity by the first user 108 within the virtual environment 102. Each virtual environment session may be separate and distinct. The secure portal may provide access to the virtual environment 102 by employing single sign-on (SSO), multifactor authentication, or any other suitable authentication scheme in order to allow the first user 108 access to the virtual environment 102.

In embodiments, the registration procedure may comprise the first user 108 transmitting registration data 118 to the server 106 to establish that the first avatar 116 corresponds to the first user 108. The server 106 may generate and store the profile 114 for the first user 108 based on the received registration data 118. The server 106 may store information related to the first user 108 in the profile 114 including, but not limited to, the profile information 112, avatar information associated with first avatar 116, device information associated with the user devices 104, account information, digital assets, or any other suitable type of information that is associated with a user within any virtual environment 102 and/or a real-world environment. The server 106 may be configured to access the profile information 112 stored in the profile 114 established during the registration procedure.

After receiving the registration data 118, the server 106 may generate an authorization token 120 configured to assign the first avatar 116 to the first user 108. The server 106 may transmit the authorization token 120 to a blockchain (such as blockchain 300 in FIG. 3) for storage. In embodiments, the server 106 may be configured to store a blockchain record 122 that corresponds to a copy of the blockchain. The blockchain may be maintained across a distributed network comprising any suitable number of devices and comprises blocks (such as blocks 302 in FIG. 3) that contain every blockchain transfer executed in the network. Blockchain transfers may comprise information, files, or any other suitable type of data. For example, a transfer may comprise information associated with software programs, real-world resource transfers, virtual resource transfers, personal information, or any other type of information.

The server 106 may further prompt the first user 108 to provide one or more gestures 113 that would correspond to a pre-authorized operation to be performed by the server 106. The provided one or more gestures 113 may be physical motions, voice commands, or a combination thereof. Further, each provided one or more gestures 113 may authorize different operations. Operations to be performed may include displaying, in the virtual environment 102, a balance of virtual resources stored as profile information 112, a balance of real-world resources stored as profile information 112, a combination thereof, digital assets such as non-fungible tokens, and the like. Other operations may include establishing an interaction session with an entity or rendered object for performing an interaction, transferring resources between profiles 114 or avatars, or any other suitable backend operation. In embodiments, the one or more gestures 113 may operate similarly to keyboard shortcuts, wherein a user may actuate one or more keys to perform an operation (such as copying data, pasting data, opening a new tab in a browser) in less time when compared to providing input through a computer mouse. For example, the first user 108 may perform a gesture 113 to trigger performance of the server 106 instead of providing input through a user interface and user devices 104.

In an example, the first user 108 may establish a gesture 113 comprising of drawing a circle with one hand to authorize the server 106 to provide the profile information 112 to the first user 108 through the virtual environment 102. In another example, the first user 108 may establish a gesture 113 comprising of a voice command including the words "display a balance for profile information," wherein the server 106 may display the profile information 112 to the first user 108 after the first user 108 speaks the voice command. The operations performed by the server 108 in response to a gesture 113 may be customized by the first user 108. For example, the first user 108 may establish a gesture 113 of drawing the circle with one hand to authorize the server 106 to display a balance of virtual resources stored in the profile information 112. The first user 108 may further establish a gesture 113 of drawing a triangle with one hand to authorize the server to display a balance of real-world resources additionally stored in the profile information 112. The server 106 may store each of the provided one or more gestures 113 as authorized gestures 123 within a gesture database 124. The gesture database 124 may be configured to store authorized gestures 123 corresponding to users. In embodiments, the first user 108 may transmit a signal comprising gesture data 126 indicative of the one or more gestures 113 to be stored in the gesture database 124. The gesture data 126 may be detected and transmitted to the server 106 via at least one of the user devices 104.

In embodiments, the server 106 may receive session data 128 associated with operation of an avatar (such as the first avatar 116) in real-time. The session data 128 may be metadata associated with a virtual environment session in which a user is active through a corresponding avatar. The session data 128 may comprise data indicating at least one gesture 113 performed by a user for a session in the virtual environment 102. The server 106 may not initially know the identity of the user associated with the received session data 128. Without the identity of the user, the server 106 may not know whether the received at least one gesture 113 authorizes an operation for the user associated with that avatar. To determine the identity of the user, the server 106 may access and search the blockchain record 122 for the corresponding authorization token 120 based on the identity of the avatar associated with the received session data 128. Once the identity of the user is known, the server 106 may access the gesture database 124 to determine whether the at least one gesture 113 performed is an authorized gesture 123 for that user. If so, the server 106 may perform an operation (such as display the profile information 112 from the profile 114 associated with that user) in the virtual environment 102.

To determine the correct authorization token 120, the server 106 may analyze one or more transfers stored in the blockchain associated with the identity of the avatar based on the received session data 128. The server 106 may perform a search query based on the hash information of the authorization token 120 generated for a given avatar to produce search results associated with that avatar. Based on the search results, the server 106 may determine the user corresponding to that avatar (such as the first user 108 for the first avatar 116). If the search query does not produce search results for the authorization token 120 generated for that avatar, the server 106 may not proceed with determining whether the at least one gesture 113 is authorized for a user.

In one or more embodiments, the server 106 may have facilitated the generation of the authorization token 120 and updated the blockchain record 122 to include the generation. In other embodiments, the server 106 may have received a signal from one or more devices communicatively coupled to the server 106 across the distributed network to update the blockchain record 122 to include the generation.

In an example wherein an authorization token 120 is determined to be generated for a given avatar, the server 106 may access the gesture database 124. While the gesture database 124 is shown as a component of server 106, the gesture database 124 may be a separate component of system 100 external to server 106. The gesture database 124 may be accessible and communicatively coupled to the server 106 and one or more external, third-party servers. An external gesture database 124 may be a suitable server (e.g., including a physical server and/or virtual server) operable to store data/information in a memory and/or provide access to application(s) or other services.

In this example, the server 106 may access the gesture database 124 storing one or more authorized gestures 123 for each user for comparison with the received at least one gesture 113 from the session data 128. If the at least one gesture 113 matches one of the one or more authorized gestures 123 for that user, the server 106 may display the profile information 112 stored in the profile 114 corresponding to that user in the virtual environment 102.

The server 106 is generally a suitable server (e.g., including a physical server and/or virtual server) operable to store data in a memory 130 and/or provide access to application(s) or other services. The server 106 may be a backend server associated with a particular group that facilitates conducting interactions between entities and one or more users. Details of the operations of the server 106 are described in conjunction with FIG. 4. Memory 130 includes software instructions 132 that, when executed by a processor 134, cause the server 106 to perform one or more functions described herein. Memory 130 may be volatile or non-volatile and may comprise a read-only memory (ROM), random-access memory (RAM), ternary content-addressable memory (TCAM), dynamic random-access memory (DRAM), and static random-access memory (SRAM). Memory 130 may be implemented using one or more disks, tape drives, solid-state drives, and/or the like. Memory 130 is operable to store software instructions 132, blockchain record 122, profile(s) 114, gesture database 124, and/or any other data or instructions. The software instructions 132 may comprise any suitable set of instructions, logic, rules, or code operable to execute the processor 134. In these examples, the processor 134 may be communicatively coupled to the memory 130 and may access the memory 130 for these determinations.

Processor 134 comprises one or more processors operably coupled to the memory 130. The processor 134 is any electronic circuitry including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 134 can include any suitable data generation engine modules. The processor 134 may be a programmable logic device, a microcontroller, a microprocessor, or any suitable combination of the preceding. The one or more processors are configured to process data and may be implemented in hardware or software. For example, the processor 134 may be 8-bit, 16-bit, 32-bit, 64-bit, or of any other suitable architecture. The processor 134 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute software instructions 132. In this way, processor 134 may be a special-purpose computer designed to implement the functions disclosed herein. In an embodiment, the processor 134 is implemented using logic units, FPGAs, ASICs, DSPs, or any other suitable hardware. The processor 134 is configured to operate as described in FIGS. 1 and 4. For example, the processor 134 may be configured to perform the steps of method 400 as described in FIG. 4.

As illustrated, the server 106 may further comprise a network interface 136. Network interface 136 is configured to enable wired and/or wireless communications (e.g., via communication network 110). The network interface 136 is configured to communicate data between the server 106 and other devices (e.g., first user device 104a, second user device 104b, third user device 104c, etc.), databases (e.g., gesture database 124), systems, or domain(s). For example, the network interface 136 may comprise a WIFI interface, a local area network (LAN) interface, a wide area network (WAN) interface, a modem, a switch, or a router. The processor 134 is configured to send and receive data using the network interface 136. The network interface 136 may be configured to use any suitable type of communication protocol as would be appreciated by one of skill in the art.

The communication network 110 may facilitate communication within the system 100. This disclosure contemplates the communication network 110 being any suitable network operable to facilitate communication between the first user device 104, second user device 106, first entity device 108, second entity device 110, and the server 106. Communication network 110 may include any interconnecting system capable of transmitting audio, video, signals, data, messages, or any combination of the preceding. Communication network 110 may include all or a portion of a local area network (LAN), a wide area network (WAN), an overlay network, a software-defined network (SDN), a virtual private network (VPN), a packet data network (e.g., the Internet), a mobile telephone network (e.g., cellular networks, such as 4G or 5G), a POT network, a wireless data network (e.g., WiFi, WiGig, WiMax, etc.), a Long Term Evolution (LTE) network, a Universal Mobile Telecommunications System (UMTS) network, a peer-to-peer (P2P) network, a Bluetooth network, a Near Field Communication network, a Zigbee network, and/or any other suitable network, operable to facilitate communication between the components of system 100. In other embodiments, system 100 may not have all of these components and/or may have other elements instead of, or in addition to, those above.

Each of the plurality of user devices 104 (i.e., first user device 104a, second user device 104b, and third user device 104c) may be any computing device configured to communicate with other devices, such as a server (e.g., server 106), databases, etc. through the communication network 110. Each of the user devices 104 may be configured to perform specific functions described herein and interact with server 106, e.g., via user interfaces. The user devices 104 are each a hardware device that is generally configured to provide hardware and software resources to a user. Examples of a user device include, but are not limited to, a virtual reality device, an augmented reality device, a laptop, a computer, a smartphone, a tablet, a smart device, a hand-held controller, an Internet-of-Things (IoT) device, or any other suitable type of device. Each user device may comprise a graphical user interface (e.g., a display), a touchscreen, a touchpad, keys, buttons, a mouse, or any other suitable type of hardware that allows a user to view data and/or to provide inputs into the user device. Each of the user devices 104 may be configured to allow a user to send requests to the server 106 or to another user device.

Example User Device

Figure 2:
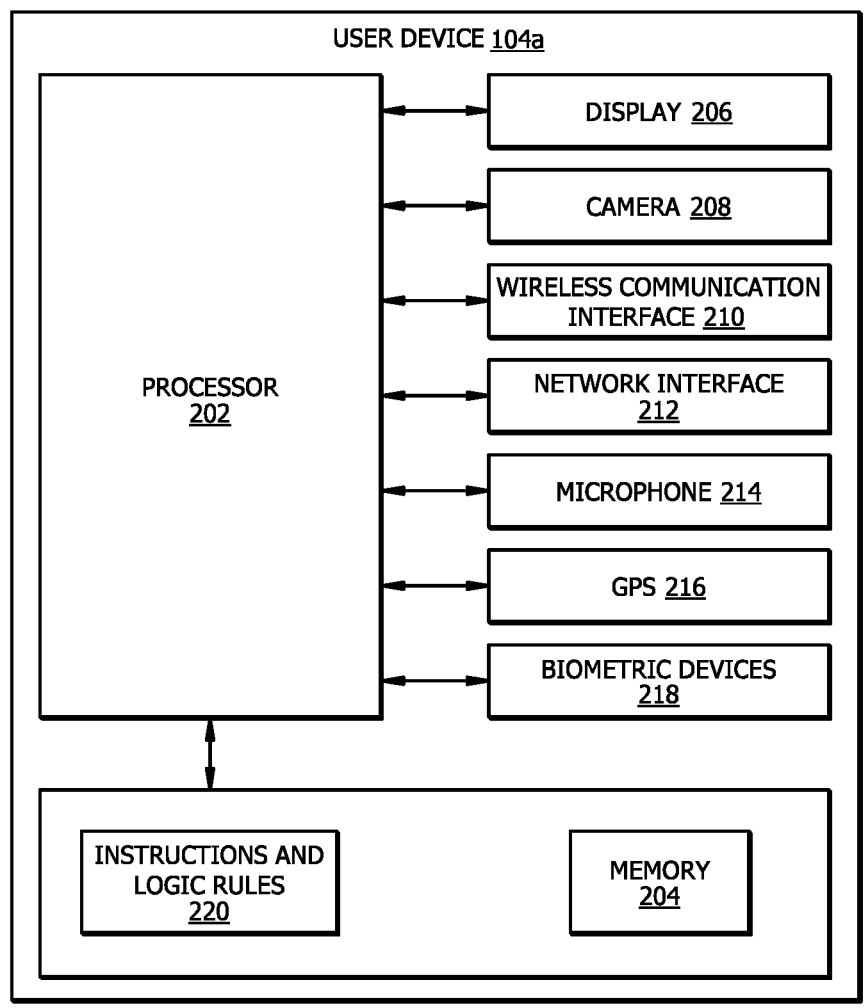
FIG. 2 is a block diagram of an example user device used in the system of FIG. 1.

FIG. 2 is a block diagram of an embodiment of the first user device 104a used by the system of FIG. 1. While FIG. 2 is an illustrative embodiment of first user device 104a, the following description of components of first user device 104a may additionally apply to each of second user device 104b and third user device 104c. First user device 104a may be configured to display the virtual environment 102 (referring to FIG. 1) within a field of view of the first user 108 (referring to FIG. 1), capture biometric, sensory, and/or physical information of the first user 108 wearing the first user device 104a. An example of the first user device 104a (and second and third user devices 104b,c) in operation is described in FIG. 4.

First user device 104a comprises a processor 202, a memory 204, and a display 206. Further embodiments may include a camera 208, a wireless communication interface 210, a network interface 212, a microphone 214, a global position system (GPS) sensor 216, and/or one or more biometric devices 218. First user device 104a may be configured as shown or in any other suitable configuration. For example, first user device 104a may comprise one or more additional components and/or one or more shown components may be omitted.

The processor 202 comprises one or more processors operably coupled to and in signal communication with memory 204, display 206, camera 208, wireless communication interface 210, network interface 212, microphone 214, GPS sensor 216, and biometric devices 218. Processor 202 is configured to receive and transmit electrical signals among one or more of memory 204, display 206, camera 208, wireless communication interface 210, network interface 212, microphone 214, GPS sensor 216, and biometric devices 218. The electrical signals are used to send and receive data (e.g., images captured from camera 208, virtual objects to display on display 206, etc.) and/or to control or communicate with other devices. Processor 202 may be operably coupled to one or more other devices (for example, the server 106 in FIG. 1). Similar to processor 134 (referring to FIG. 1), the processor 202 may be operable to identify a gesture performed by the first user 108.

The processor 202 is any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor 202 may be a programmable logic device, a microcontroller, a microprocessor, or any suitable combination of the preceding. The one or more processors are configured to process data and may be implemented in hardware or software. For example, the processor 202 may be 8-bit, 16-bit, 32-bit, 64-bit or of any other suitable architecture. The processor 202 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement the function disclosed herein, such as some or all of those described with respect to FIGS. 1 and 4. For example, processor 202 may be configured to display virtual objects on display 206, detect hand gestures, detect head gestures, detect audio signals, identify virtual objects selected by a detected hand gesture (e.g., identify selected files), capture biometric information of a user, such as first user 108, via one or more of camera 208, microphone 214, and/or biometric devices 218, and communicate via wireless communication interface 210 with server 106. In some embodiments, the function described herein is implemented using logic units, FPGAs, ASICs, DSPs, or any other suitable hardware or electronic circuitry.

Figure 4:
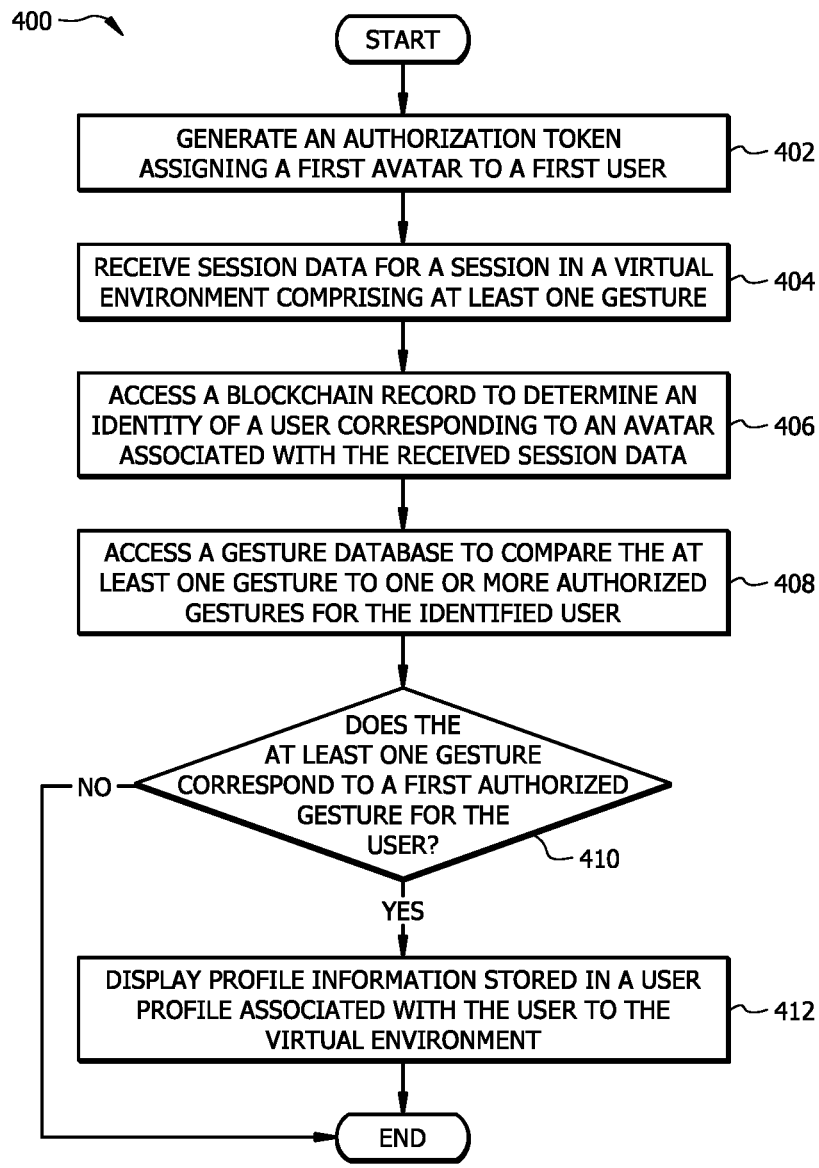
FIG. 4 is a flow diagram illustrating an example operation of the system of FIG. 1.

The memory 204 is operable to store any of the information described with respect to FIGS. 1 and 4 along with any other data, instructions, logic, rules, or code operable to implement the function(s) described herein when executed by processor 202. For example, the memory 204 may store the instructions and logic rules 220, which are described below with respect to FIG. 4. The memory 204 comprises one or more disks, tape drives, or solid-state drives, and may be used as an over-flow data storage device, to store programs when such programs are selected for execution, and to store instructions and data that are read during program execution. Memory 204 is operable to store, for example, instructions for performing the functions of first user device 104a described herein, and any other data or instructions. The memory 204 may be volatile or non-volatile and may comprise read-only memory (ROM), random-access memory (RAM), ternary content-addressable memory (TCAM), dynamic random-access memory (DRAM), and static random-access memory (SRAM).

Display 206 is configured to present visual information to a user (for example, first user 108 in FIG. 1) in an augmented reality environment that overlays virtual or graphical objects onto tangible objects in a real scene in real-time. In other embodiments, the display 206 is configured to present visual information to the user as the virtual environment 102 (referring to FIG. 1) in real-time. In an embodiment, display 206 is a wearable optical display (e.g., glasses or a headset) configured to reflect projected images and enables a user to see through the display. For example, display 206 may comprise display units, lens, semi-transparent mirrors embedded in an eye glass structure, a visor structure, or a helmet structure. Examples of display units include, but are not limited to, a cathode ray tube (CRT) display, a liquid crystal display (LCD), a liquid crystal on silicon (LCOS) display, a light emitting diode (LED) display, an active matrix OLED (AMOLED), an organic LED (OLED) display, a projector display, or any other suitable type of display as would be appreciated by one of ordinary skill in the art upon viewing this disclosure. In another embodiment, display 206 is a graphical display on a user device. For example, the graphical display may be the display of a tablet or smart phone configured to display an augmented reality environment with virtual or graphical objects onto tangible objects in a real scene in real-time and/or virtual environment 102.

Examples of camera 208 include, but are not limited to, charge-coupled device (CCD) cameras and complementary metal-oxide semiconductor (CMOS) cameras. Camera 208 is configured to capture images of a wearer of first user device 104a, such as first user 108. Camera 208 may be configured to capture images continuously, at predetermined intervals, or on-demand. For example, camera 208 may be configured to receive a command from first user 108 to capture an image. In another example, camera 208 is configured to continuously capture images to form a video stream. Camera 208 is communicably coupled to processor 202.

Examples of wireless communication interface 210 include, but are not limited to, a Bluetooth interface, an RFID interface, a near field communication interface, a local area network (LAN) interface, a personal area network interface, a wide area network (WAN) interface, a Wi-Fi interface, a ZigBee interface, or any other suitable wireless communication interface as would be appreciated by one of ordinary skill in the art upon viewing this disclosure. Wireless communication interface 210 is configured to facilitate processor 202 in communicating with other devices. For example, wireless communication interface 210 is configured to enable processor 202 to send and receive signals with other devices, such as server 106 (referring to FIG. 1). Wireless communication interface 210 is configured to employ any suitable communication protocol.

The network interface 212 is configured to enable wired and/or wireless communications. The network interface 212 is configured to communicate data between the first user device 104a and other network devices, systems, or domain(s). For example, the network interface 212 may comprise a WIFI interface, a local area network (LAN) interface, a wide area network (WAN) interface, a modem, a switch, or a router. The processor 202 is configured to send and receive data using the network interface 212. The network interface 212 may be configured to use any suitable type of communication protocol as would be appreciated by one of ordinary skill in the art.

Microphone 214 is configured to capture audio signals (e.g., voice signals or commands) from a user, such as first user 108. Microphone 214 is configured to capture audio signals continuously, at predetermined intervals, or on-demand. Microphone 214 is communicably coupled to processor 202. In alternate embodiments, microphone 214 may be replaced with any other suitable audio sensor configured to detect audio signals.

GPS sensor 216 is configured to capture and to provide geographical location information. For example, GPS sensor 216 is configured to provide a geographic location of a user, such as first user 108, employing first user device 104a. GPS sensor 216 may be configured to provide the geographic location information as a relative geographic location or an absolute geographic location. GPS sensor 216 may provide the geographic location information using geographic coordinates (i.e., longitude and latitude) or any other suitable coordinate system. GPS sensor 216 is communicably coupled to processor 202.

Examples of biometric devices 218 may include, but are not limited to, retina scanners and fingerprint scanners. Biometric devices 218 are configured to capture information about a person's physical characteristics and to output a biometric signal based on captured information. A biometric signal is a signal that is uniquely linked to a person based on their physical characteristics. For example, biometric device 218 may be configured to perform a retinal scan of the user's eye and to generate a biometric signal for the user based on the retinal scan. As another example, a biometric device 218 is configured to perform a fingerprint scan of the user's finger and to generate a biometric signal for the user based on the fingerprint scan. Biometric device 218 is communicably coupled to processor 202.

Example Block of the Blockchain Record

Figure 3:
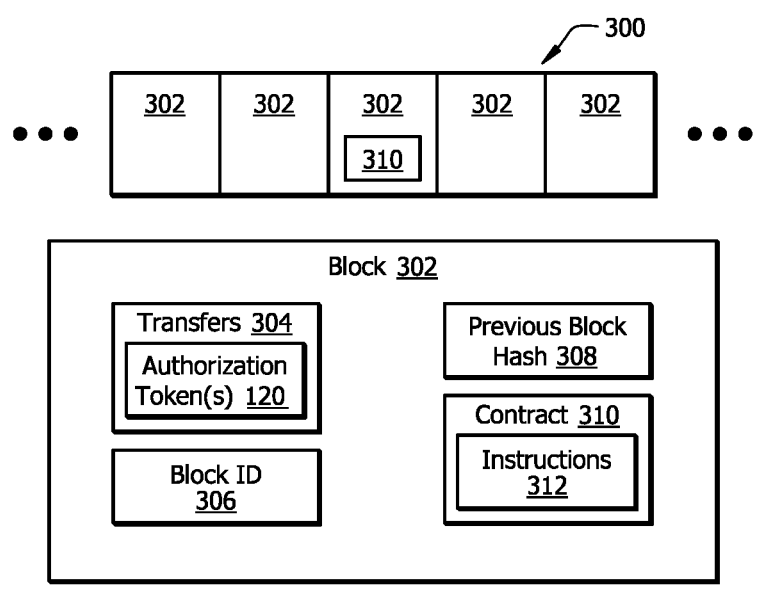
FIG. 3 is an embodiment of a blockchain used in the system of FIG. 1.

FIG. 3 illustrates an embodiment of a blockchain 300 from the blockchain record 122 of FIG. 1. The blockchain 300 links together blocks 302 of data which comprise identifiable units called transfers 304. Transfers 304 may comprise information, files, or any other suitable type of data. For example, a transfer 304 may comprise information associated with smart contracts, real-world resource transfers, virtual resource transfers, personal information, or any other type of information.

Each block 302 in the blockchain 300 comprises a block identifier 306 and information derived from a preceding block 302. For example, every block 302 in the blockchain 300 includes a hash 308 of the previous block 302. By including the hash 308, the blockchain 300 comprises a chain of blocks 302 from a genesis block 302 to the current block 302. Each block 302 is guaranteed to come after the previous block 302 chronologically because the previous block's hash 308 would otherwise not be known. In one embodiment, blocks 302 in a blockchain 300 may be linked together by identifying a preceding block 302 with a cryptographic checksum (e.g., secure hash algorithm (SHA)-256) of its contents (e.g., the transfer and additional metadata) which serves as each block's unique identifier. Links are formed by storing the cryptographic checksum identifier of one block 302 in the metadata of another block 302, such that the former block 302 becomes the predecessor of the latter block 302. In this way, the blocks 302 form a chain that can be navigated from block-to-block by retrieving the cryptographic checksum of a particular block's predecessor from the particular block's own metadata. Each block 302 is computationally impractical to modify once it has been in the blockchain because every block 302 after it would also have to be regenerated. These features protect data stored in the blockchain 300 from being modified by bad actors which provides information security. When a network node creates an entry (e.g., one or more transfers 304 in a block 302) in its blockchain record 122, the blockchain 300 for all other network nodes in the distributed network is also updated with the new entry. Thus, data entered in a blockchain 300 is available and accessible to every network node with a copy of the blockchain record 122. This allows the data stored in the block 302 to be accessible for inspection and verification at any time by any device with a copy of the blockchain record 122.

Some blocks 302 comprise one or more contracts 310 (herein referred as "software programs"). The software programs comprise machine-executable code, script, or instructions 312 that are configured to execute when a set of predetermined conditions have been satisfied. The software program is configured to receive messages or information from other devices (e.g., user devices 104 or server 106) and to use the conditions as logical tests to determine whether or not to execute a set of instructions 312. The software program, instructions 312, and conditions may be written in C++, C#, Go, Python, Java, extensible markup language (XML) script, or any other suitable programming language. The instructions 312 may be configured with instructions for performing any specified operations. For example, the instructions 312 may be configured to facilitate a real-world resource transfer and/or a virtual resource transfer between users. In one embodiment, the instructions 312 comprise instructions for entering a transfer in the blockchain 300 comprising generated authorization tokens 120, wherein the information associated with each generated authorization token 120 may be publicly available on the blockchain 300. In other embodiments, the instructions 312 may comprise any other suitable type and combination of machine-executable instructions for performing other types of operations. The conditions may be configured as Boolean tests for determining whether a condition has been satisfied. Examples of conditions include, but are not limited to, range threshold values, valid time periods, approved product and service types, approved locations or areas, or any other suitable type of condition.

In embodiments, the server 106 may generate the authorization token 120 associated with the first user 108 and the first avatar 116. In this case, the server 106 may send instructions or commands to one or more software programs in the blockchain record 122 to execute the one or more software programs to add the generated authorization token 120 within a transfer 304.

Example Operation of the System for Displaying Profile Information in a Virtual Environment FIG. 4 is a flow diagram illustrating an example method 400 of the system 100 of FIG. 1. The method 400 may be implemented using the user devices 104 and the server 106 of FIG. 1. The method 400 may begin at operation 402 where the processor 134 (referring to FIG. 1) of the server 106 may generate an authorization token 120 (referring to FIG. 1) configured to assign the first avatar 116 (referring to FIG. 1) to the first user 108 (referring to FIG. 1). In embodiments, generation of the authorization token 120 may occur after the first user 108 has performed a registration procedure with the server 106. The processor 134 of the server 106 may then transmit the authorization token 120 to a blockchain for storage.

At operation 404, the processor 134 of the server 106 may receive session data 128 (referring to FIG. 1) associated with operation of an avatar (such as the first avatar 116) in real-time. The session data 128 may comprise data indicating at least one gesture 113 (referring to FIG. 1) performed by a user for a session in the virtual environment 102. The server 106 may not know the identity of the user associated with the received session data 128. To determine the identity of the user, the server 106 may access and search the blockchain record 122 (referring to FIG. 1) based on the identity of the avatar associated with the received session data 128 to determine the authorization token 120 that corresponds to that avatar. The identity of the user may be determined from the corresponding authorization token 120 found in the blockchain record 122.

At operation 406, the processor 134 of the server 106 may proceed with accessing the blockchain record 122. The processor 134 may access the memory 130 (referring to FIG. 1) to search the blockchain record 122. The processor 134 may analyze one or more transfers 304 (referring to FIG. 3) stored in the blockchain 300 (referring to FIG. 3) associated with the identity of the avatar based on the received session data 128. The processor 134 may perform a search query based on the hash information of the authorization token 120 generated for a given avatar to produce search results associated with that avatar. Based on the search results, the processor 134 may determine the user corresponding to that avatar (such as the first user 108 for the first avatar 116). If the search query does not produce search results for the authorization token 120 generated for that avatar, the processor 134 may not proceed with method 400.

At operation 408, the processor 134 of the server 106 may access the gesture database 124 (referring to FIG. 1) storing one or more authorized gestures 123 (referring to FIG. 1) for comparison with the received at least one gesture 113 from the session data 128. For example, the server 106 may have previously prompted a user to provide one or more gestures 113 that would correspond to a pre-authorized operation to be performed by the server 106. The processor 134 of server 106 may have further stored each of the provided one or more gestures 113 as authorized gestures 123 for a given user within the gesture database 124. As the server 106 may have determined the identity of the user from operation 406, the processor 134 may be capable of determining whether the received at least one gesture 113 is an authorized gesture 123 for that user. In these examples, each gesture 113 may be associated with different actions that, when performed by a user, may be processed as an authorization to perform a specific operation. Without limitations, the actions performed as a gesture 113 may include any suitable physical movements or sounds generated by a user. Example gestures as physical movements may include a hand motion, an arm motion, a head motion, or any combinations thereof. Example gestures as audio signals may include a sound, a word, a phrase comprising more than one word, or any combination thereof. For example, a first gesture may comprise of drawing a circle with one hand, wherein the first gesture may authorize the server 106 to display a balance of visual resources stored in the profile information 112 (referring to FIG. 1) of a given user to that user through the virtual environment 102. In another example, a second gesture may comprise of speaking the phrase "display real-world resource balance", wherein the second gesture may authorize the server to display a balance of real-world resources stored in the profile information 112 to the user through the virtual environment 102. In these examples, the gesture 113 may have been detected by the user devices 104 during a virtual environment session and received by the server 106 within the session data 128 during operation 404.

At operation 410, the processor 134 may determine whether the at least one gesture 113 from the received session data 128 corresponds to a first authorized gesture of the one or more authorized gestures 123 stored for the identified user. While accessing the gesture database 124, the processor 134 may analyze the one or more authorized gestures 123 stored for the identified user from operation 406 for comparison to the received at least one gesture 113. In embodiments, there may be an acceptable tolerance value of difference between the at least one gesture 113 and each of the one or more authorized gestures 123 stored in the gesture database 124. Without limitations, the acceptable tolerance value may be from about 1% to about 10%, 15%, 20%, or any other suitable value. The acceptable tolerance value may correspond to a decibel level for voice commands, a difference in words used in a voice command, a time period for voice commands, a shape of a physical movement, a size of a physical movement, and the like. In embodiments, comparing the received at least one gesture 113 to the one or more authorized gestures 123 may comprise determining that the difference between the at least one gesture 113 and one of the one or more authorized gestures 123 (i.e., a first authorized gesture) is less than the acceptable tolerance value. If the processor 134 determines that the at least one gesture 113 from the received session data 128 does correspond to a first authorized gesture, the method 400 proceeds to operation 412. Otherwise, the method 400 proceeds to end.

At operation 412, in response to determining that the at least one gesture 113 from the received session data 128 does correspond to a first authorized gesture, the processor 134 of the server 106 may display the profile information 112 stored in the profile 114 (referring to FIG. 1) associated with the identified user in the virtual environment 102. In this example, the pre-authorized operation for the server 106 may be to display the profile information 112 or at least a portion of the profile information 112. In other embodiments, the first authorized gesture may prompt the server 106 to perform a different operation, such as to send a communication to a third party or to transfer resources between profiles 114 of different users. The processor 134 may generate and display the profile information 112 in a widget and/or user interface to be viewed by the identified user in the virtual environment 102 through a user device. In this example, the server 106 may have received session data 128 associated with the first avatar 116 (referring to FIG. 1) and identified the user as the first user 108, and the profile information 112 stored in the profile 114 corresponding to the first user 108 may be displayed in the virtual environment 102. Then, the method 400 proceeds to end.

While several embodiments have been provided in the present disclosure, it should be understood that the disclosed systems and methods might be embodied in many other specific forms without departing from the spirit or scope of the present disclosure. The present examples are to be considered as illustrative and not limiting, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 106(f) as it exists on the date of filing hereof unless the words "means for" or "step for" are explicitly used in the particular claim.

The invention claimed is:

1. An apparatus for displaying profile information in a virtual environment, comprising:
   a memory operable to:
      store a blockchain record comprising a plurality of transfers for a blockchain; and
      store a plurality of user profiles, wherein each one of the plurality of user profiles is associated with a user; and
   a processor, operably coupled to the memory, configured to:
      establish a first avatar associated with a first user in response to receiving registration data from a first user device associated with the first user, wherein the first user device is an augmented reality device;
      store a first user profile associated with the first user based on the received registration data, wherein the first user profile comprises profile information;
      in response to receiving registration data from the first user device, generate an authorization token configured to assign the first avatar to the first user, wherein the authorization token is stored within the plurality of transfers of the blockchain record;
      receive session data associated with the first avatar, wherein the session data comprises at least one gesture for a session in the virtual environment, wherein the at least one gesture is a physical motion gesture performed by the user associated with the augmented reality device that prompts the processor to perform an authorized operation;
      in response to receiving the session data associated with the first avatar, analyze the plurality of transfers of the blockchain record that are associated with the first avatar by utilizing the received session data based on performing a search query on hash information of the authorization token to produce search results associated with the first avatar;
      confirm an identity of the first user assigned to the first avatar, based on the search results associated with the first avatar;
      in response to confirming the identity of the first user, compare the at least one gesture of the session data to one or more authorized gestures to determine a difference between the at least one gesture of the session data and a first authorized gesture of the one or more authorized gestures, wherein the one or more authorized gestures include the first authorized gesture configured to prompt the processor to display the profile information associated with real-world resources of the first user and a second authorized gesture configured to prompt the processor to display the profile information associated with virtual resources of the first user, wherein the second authorized gesture is different from the first authorized gesture;
      in response to determining the difference between the at least one gesture of the session data and the first authorized gesture of the one or more authorized gestures, determine if the difference is within an acceptable tolerance value, wherein the acceptable tolerance value is a percentage value that corresponds to a shape of the physical motion gesture;
      in response to determining that the difference is within the acceptable tolerance value, identify the first authorized gesture corresponds to the at least one gesture of the session data; and
      in response to identifying the first authorized gesture, display the profile information associated with real-world resources of the first user in the virtual environment that is stored in the first user profile associated with the first user.

2. The apparatus of claim 1, wherein the first user device associated with the first user is configured to detect the physical motion gesture.

3. The apparatus of claim 1, wherein the at least one gesture comprises audio signals generated by the first user, wherein a first user device associated with the first user is configured to detect the audio signals.

4. The apparatus of claim 1, wherein comparing the at least one gesture of the session data to the one or more authorized gestures comprises accessing a gesture database storing the one or more authorized gestures to identify the first authorized gesture associated with the first user.

5. The apparatus of claim 1, wherein the first user profile comprises avatar information associated with the first avatar, device information associated with the first user device, and digital assets information that is associated with first user within a real-world environment.

6. The apparatus of claim 1, wherein the first authorized gesture is to draw a triangle with one hand of the first user and the second authorized gesture is to draw a circle with the one hand of the first user.

7. The apparatus of claim 6, wherein the processor is further configured to:
   access the blockchain record to determine a transfer comprising information associated with the generated authorization token.

8. A method for displaying profile information in a virtual environment, comprising:
   establishing a first avatar associated with a first user in response to receiving registration data from a first user device associated with the first user, wherein the first user device is an augmented reality device;
   storing a first user profile associated with the first user based on the received registration data, wherein the first user profile comprises profile information;
   in response to receiving registration data from the first user device, generating an authorization token configured to assign the first avatar to the first user, wherein the authorization token is stored within the plurality of transfers of the blockchain record;
   receiving session data associated with the first avatar, wherein the session data comprises at least one gesture for a session in the virtual environment, wherein the at least one gesture is a physical motion gesture performed by the user associated with the augmented reality device that prompts the processor to perform an authorized operation;
   in response to receiving the session data associated with the first avatar, analyzing the plurality of transfers of the blockchain record that are associated with the first avatar by utilizing the received session data based on performing a search query on hash information of the authorization token to produce search results associated with the first avatar;

confirming an identity of the first user assigned to the first avatar, based on the search results associated with the first avatar;

in response to confirming the identity of the first user, comparing the at least one gesture of the session data to one or more authorized gestures to determine a difference between the at least one gesture, wherein the one or more authorized gestures include the first authorized gesture configured to prompt the processor to display the profile information associated with real-world resources of the first user and a second authorized gesture configured to prompt the processor to display the profile information associated with virtual resources of the first user, wherein the second authorized gesture is different from the first authorized gesture;

in response to determining the difference between the at least one gesture of the session data and the first authorized gesture of the one or more authorized gestures, determining if the difference is within an acceptable tolerance value, wherein the acceptable tolerance value is a percentage value that corresponds to a shape of the physical motion gesture;

in response to determining that the difference is within the acceptable tolerance value, identifying the first authorized gesture corresponds to the at least one gesture of the session data; and in response to identifying the first authorized gesture, displaying the profile information associated with real-world resources of the first user in the virtual environment that is stored in the first user profile associated with the first user.

9. The method of claim 8, wherein the first user device associated with the first user is configured to detect the physical motion gesture.

10. The method of claim 8, wherein the at least one gesture comprises audio signals generated by the first user, wherein a first user device associated with the first user is configured to detect the audio signals.

11. The method of claim 8, wherein comparing the at least one gesture of the session data to the one or more authorized gestures comprises accessing a gesture database storing the one or more authorized gestures to identify the first authorized gesture associated with the first user.

12. The method of claim 8, wherein the first user profile comprises avatar information associated with the first avatar, device information associated with the first user device, and digital assets information that is associated with first user within a real-world environment.

13. The method of claim 8, wherein the first authorized gesture is to draw a triangle with one hand of the first user and the second authorized gesture is to draw a circle with the one hand of the first user.

14. The method of claim 13, further comprising:
accessing the blockchain record to determine a transfer comprising information associated with the generated authorization token.

15. A non-transitory computer-readable medium storing instructions that when executed by a processor, cause the processor to:
establish a first avatar associated with a first user in response to receiving registration data from a first user device associated with the first user, wherein the first user device is an augmented reality device;
store a first user profile associated with the first user based on the received registration data, wherein the first user profile comprises profile information;
in response to receiving registration data from the first user device, generate an authorization token configured to assign the first avatar to the first user, wherein the authorization token is stored within the plurality of transfers of the blockchain record;
receive session data associated with the first avatar, wherein the session data comprises at least one gesture for a session in a virtual environment, wherein the at least one gesture is an action a physical motion gesture performed by the user associated with the augmented reality device that prompts the processor to perform an authorized operation;
in response to receiving the session data associated with the first avatar, analyze the plurality of transfers of the blockchain record that are associated with the first avatar by utilizing the received session data based on performing a search query on hash information of the authorization token to produce search results associated with the first avatar;
confirm an identity of the first user assigned to the first avatar, based on the search results associated with the first;
in response to confirming the identity of the first user, compare the at least one gesture of the session data to one or more authorized gestures to determine a difference between the at least one gesture of the session data and a first authorized gesture of the one or more authorized gestures, wherein the one or more authorized gestures include the first authorized gesture configured to prompt the processor to display the profile information associated with real-world resources of the first user and a second authorized gesture configured to prompt the processor to display the profile information associated with virtual resources of the first user, wherein the second authorized gesture is different from the first authorized gesture;
in response to determining the difference between the at least one gesture of the session data and the first authorized gesture of the one or more authorized gestures, determine if the difference is within an acceptable tolerance value, wherein the acceptable tolerance value is a percentage value that corresponds to a shape of the physical motion gesture;
in response to determining that the difference is within the acceptable tolerance value, identify the first authorized gesture corresponds to the at least one gesture of the session data; and
in response to identifying the first authorized gesture, display the profile information associated with real-world resources of the first user in the virtual environment that is stored in the first user profile associated with the first user.

16. The non-transitory computer-readable medium of claim 15, wherein the first user device associated with the first user is configured to detect the physical motion gesture.

17. The non-transitory computer-readable medium of claim 15, wherein the at least one gesture comprises audio signals generated by the first user, wherein a first user device associated with the first user is configured to detect the audio signals.

18. The non-transitory computer-readable medium of claim 15, wherein comparing the at least one gesture of the session data to the one or more authorized gestures comprises accessing a gesture database storing the one or more authorized gestures to identify the first authorized gesture associated with the first user.

19. The non-transitory computer-readable medium of claim 15, wherein the first authorized gesture is to draw a triangle with one hand of the first user and the second authorized gesture is to draw a circle with the one hand of the first user.

20. The non-transitory computer-readable medium of claim 15, wherein the instructions further cause the processor to:
- access the blockchain record to determine a transfer comprising information associated with the generated authorization token.

* * * * *